(12) United States Patent
Glass

(10) Patent No.: US 9,587,662 B2
(45) Date of Patent: Mar. 7, 2017

(54) THREADED FASTENER HOLE REPAIR APPARATUS

(71) Applicant: Richard Vandrew Glass, Huntington Beach, CA (US)

(72) Inventor: Richard Vandrew Glass, Huntington Beach, CA (US)

(*) Notice: Subject to any disclaimer, the term of this patent is extended or adjusted under 35 U.S.C. 154(b) by 209 days.

(21) Appl. No.: 14/511,501

(22) Filed: Oct. 10, 2014

(65) Prior Publication Data

US 2016/0102698 A1   Apr. 14, 2016

(51) Int. Cl.
  F16B 35/04   (2006.01)
  F16B 13/12   (2006.01)
  F16B 13/00   (2006.01)
  F16B 33/00   (2006.01)

(52) U.S. Cl.
  CPC .......... F16B 13/128 (2013.01); F16B 13/002 (2013.01); F16B 33/006 (2013.01)

(58) Field of Classification Search
  CPC ..... F16B 13/128; F16B 13/002; F16B 33/006
  USPC .......................... 411/3, 42, 60.2, 63, 66, 411
  See application file for complete search history.

(56) References Cited

U.S. PATENT DOCUMENTS

| | | | | |
|---|---|---|---|---|
| 5,145,301 A * | 9/1992 | Yamamoto | ............ | F16B 13/141 411/508 |
| 5,160,225 A * | 11/1992 | Chern | ................... | F16B 13/002 408/203.5 |
| 5,308,203 A * | 5/1994 | McSherry | ............. | F16B 13/002 411/31 |
| 5,332,153 A * | 7/1994 | Leibhard | ............... | F16B 13/124 238/373 |
| 5,425,407 A * | 6/1995 | Archuleta | ............... | B29C 73/06 152/370 |
| 5,738,278 A * | 4/1998 | Franz | .................... | F16B 13/141 238/265 |
| 5,881,523 A * | 3/1999 | Quatrochi, Jr. | ..... | E04G 23/0203 52/514.5 |
| 6,315,510 B1 * | 11/2001 | Sturies | .................... | F16B 13/00 411/182 |
| 6,755,835 B2 * | 6/2004 | Schultheiss | ........ | A61B 17/8685 606/304 |
| 2009/0001187 A1* | 1/2009 | Mahikian | ................ | E01B 31/26 238/377 |

(Continued)

*Primary Examiner* — Gary Estremsky
(74) *Attorney, Agent, or Firm* — The Keys Law Firm PLLC

(57) ABSTRACT

A threaded fastener hole repair apparatus for repairing a stripped target screw hole so that the desired screw can once again be secured therein comprises an elongated, conical fastener sleeve having a threaded exterior surface and a substantially hollow, conical interior. The elongated fastener sleeve is made up of ten discrete breakaway portions, defined as a single proximal end section and nine sleeve sections, with each separated by a circumferential score in the fastener sleeve, thereby allowing the fastener sleeve to be resized by snapping off breakaway portions a desired point. The substantially hollow, conical interior of the fastener sleeve includes four elongated flaps which run in a narrowing manner along the wall of the conical interior in the fastener sleeve, providing an additional surface inside the conical interior of the fastener sleeve to mesh with the threads of the screw being inserted into the fastener sleeve.

9 Claims, 3 Drawing Sheets

(56) References Cited

U.S. PATENT DOCUMENTS

2011/0262241 A1* 10/2011 Bosterling ................ E01B 9/18
411/55

* cited by examiner

THREADED FASTENER HOLE REPAIR APPARATUS

DETAILED DESCRIPTION OF THE INVENTION

Figure 1:
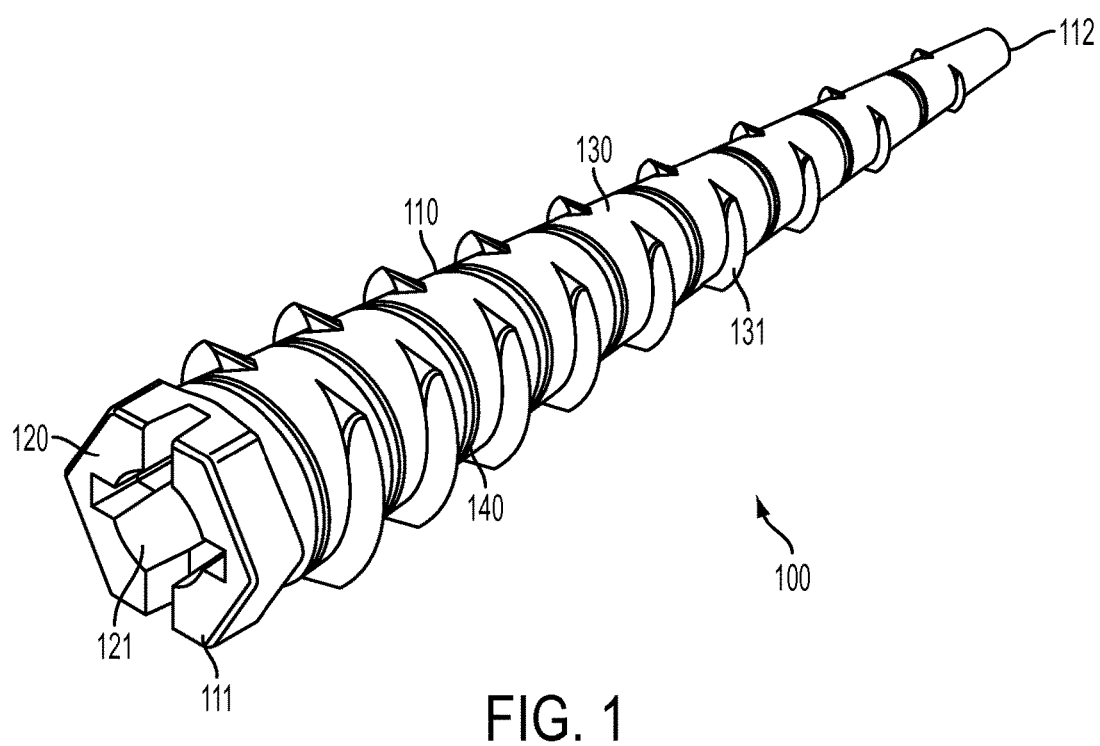
FIG. 1 is a side perspective view of a threaded fastener hole repair apparatus built in accordance with the present invention.
Figure 2:
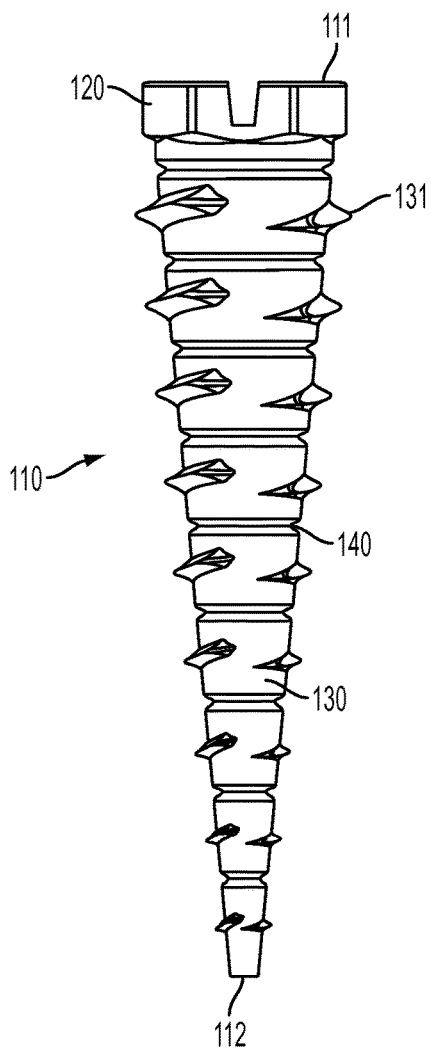
FIG. 2 is a front side elevational view of a threaded fastener hole repair apparatus built in accordance with the present invention.
Figure 3:
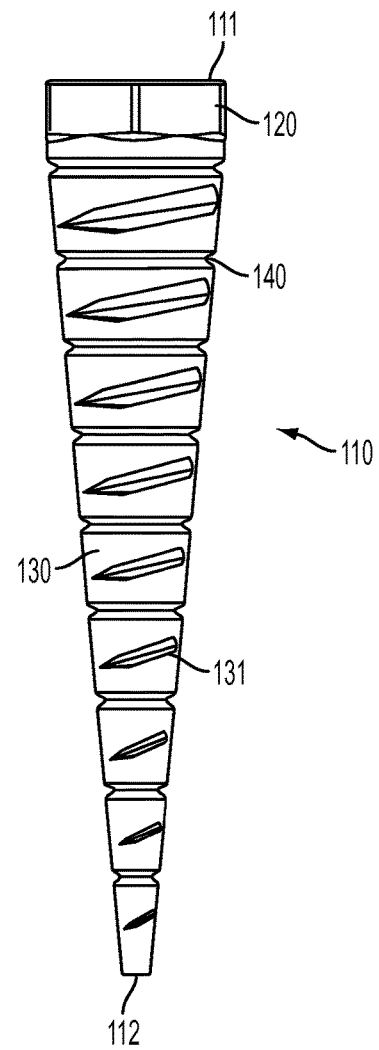
FIG. 3 is a left side elevational view of a threaded fastener hole repair apparatus built in accordance with the present invention.
Figure 4:
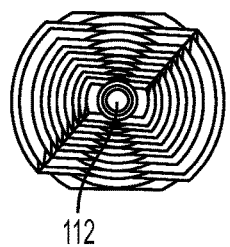
FIG. 4 is an elevational view of the proximal end of a threaded fastener hole repair apparatus built in accordance with the present invention.
Figure 5:
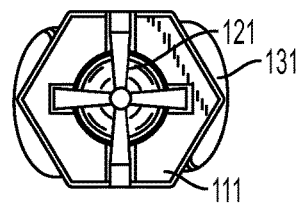
FIG. 5 is an elevational view of the distal end of a threaded fastener hole repair apparatus built in accordance with the present invention.
Figure 6:
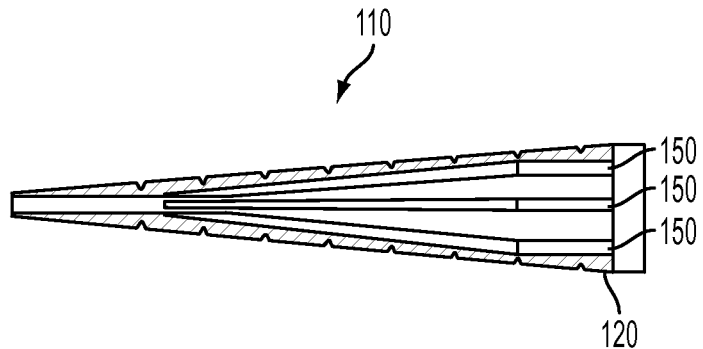
FIG. 6 is a side cross-sectional view of a threaded fastener hole repair apparatus built in accordance with the present invention.

Referring now to the drawings and in particular FIGS. 1, 2, 3, 4, 5 and 6, a threaded fastener hole repair apparatus 100 (or screw hole repair apparatus) is defined by an elongated, conical fastener sleeve 110 having a threaded exterior surface and a substantially hollow, conical interior. The fastener sleeve 110 spans from its proximal end 111 to its distal end 112, and, consistent with its overall conical shape, the proximal end 111 has a larger diameter that the distal end 112. In the preferred embodiment, the fastener sleeve 110 is constructed of hard plastic and measures 2.02 inches long and with a 0.45 inch diameter at its proximal end 111. It is contemplated that in alternate embodiments, the fastener sleeve 110 is constructed of plastic, wood, cast aluminum, or other rigid materials, in whole or in part, or a combination thereof.

In the preferred embodiment, the elongated fastener sleeve 110 is made up of ten (10) discrete breakaway portions, defined as a single proximal end section 120 and nine (9) sleeve sections 130, with each separated by a circumferential score 140 in the fastener sleeve 110. It is contemplated, however, that in alternate embodiments, the fastener sleeve may be made up of a proximal end section 120 with any number of discrete sleeve sections.

In the preferred embodiment, the proximal end section 120 includes a fastener head 121 with a combined slot screw drive and phillips screw drive. It is understood, however, that the fastener head 121 can be constructed with any desired type of screw drive that will allow torque to be applied to it.

The plurality of circumferential scores 140 separating the breakaway portions are spaced out along the length of the fastener sleeve 110 and are each defined by a substantially narrowing of the fastener sleeve 110. Consistent with the conical shape of the fastener sleeve 110, each sequential sleeve section 130 and circumferential score 140 moving away from the proximal end section 120 has slightly smaller in diameter than the previous respective sequential sleeve section 130 and circumferential score 140. The sleeve section 130 on the distal end 112 of the fastener sleeve is the narrowest sleeve section 130 and provides the point of entry for the fastener sleeve 110 when used to repair a threaded fastener hole in accordance with the present invention.

Because they are substantially narrower that the breakaway portions, the circumferential scores 140 serve as break off points on the fastener sleeve 110 where the fastener sleeve 110 can be selectively shortened to. Such resizing of the fastener sleeve 110 is accomplished by merely selecting the circumferential score 140 representing the shorter desired length of the fastener sleeve 110 and breaking off at the selected circumferential score 140 the breakaway portions that are proximal to the proximal end section 120 relative to the selected circumferential score 140. It is contemplated that the narrowed circumferential scores 140 enable breakaway portions to be snapped off of the fastener sleeve 110 through the application of manual force to leave the remaining fastener sleeve 110 at a desired length.

The threaded exterior surface of the fastener sleeve 110 defines a plurality of discrete ridges 131 of raised external screw threads. In the preferred embodiment, each of the sleeve sections 130 includes a pair of ridges 131, with a single discrete ridge 131 disposed on either side thereof and all of the ridges 131 on the separate sleeve sections 130 of the fastener sleeve 110 aligned relative to each other. In alternate embodiments, the ridges on separate, adjacent sleeve sections may not be aligned relative to each other or each of the sleeve sections may include a continuous helical ridge which encircles it completely or partially.

The substantially hollow, conical interior of the fastener sleeve 110 includes four (4) elongated flaps 150 which run in a narrowing manner along the wall of the conical interior in the fastener sleeve 110. In the preferred embodiment, the elongated flaps 150 extend from the proximal end section 120 to nearly the distal end 112 of the fastener sleeve 110. As it is contemplated that when the fastener sleeve 110 is in place in a stripped screw hole to enable a screw (not shown) associated with that hole to be inserted in perfect alignment as it would be if the screw hole was in its original condition, it is understood that the conical interior of the fastener sleeve 110 is sized to mesh with the exterior threads of the screw being inserted such that as the shaft of the screw is rotated relative to the stationary fastener sleeve 110, the screw moves into the conical interior of the fastener sleeve 110.

The elongated flaps 150 provide an additional surface inside the conical interior of the fastener sleeve 110 to mesh with the threads of the screw being inserted into the fastener sleeve 110. In this regard, the presence of the elongated flaps 150 changes the character of the conical interior of the fastener sleeve 110 from smooth to ridged, thereby providing a raised surface for the threads of the screw being inserted therein to frictionally engage. The advantage of using elongated flaps 150, as opposed to build in ridges in the conical interior of the fastener sleeve 110, is the elongated flaps 150 provide the ridged surface without increasing the thickness of the fastener sleeve 110, particularly at the circumferential scores 140, that would make it more difficult to resize the fastener sleeve 100.

In alternate embodiments, the an alternate number of elongated flaps 150 or no elongated flaps 150 are included in the conical interior, the elongated flaps 150 extend for varying lengths inside the fastener sleeve 110, or the conical interior of the fastener sleeve 110 includes integrated ridges running longitudinally therethrough at varying lengths. In embodiments lacking elongated flaps 150, the wall of the conical interior solely provides the surface for meshing with the threads of the screw being inserted into the fastener sleeve 110.

It is contemplated that when a screw is inserted into the fastener sleeve 110 in accordance with the present invention, the screw will be sized to place expansion pressure on the fastener sleeve 110, thereby causing it to be held more tightly in the stripped screw hole in which it is disposed.

Figure 7:
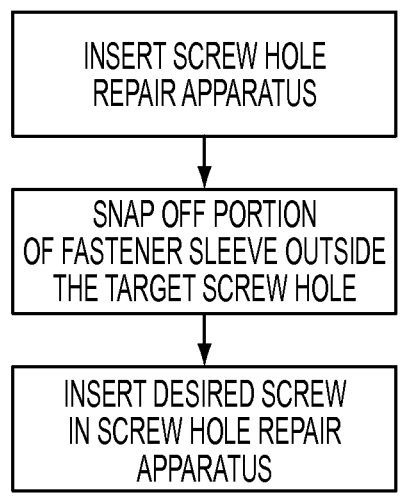
FIG. 7 shows the steps of a threaded fastener hole repair processes in accordance with the present invention.

Referring now to FIG. 7, the screw hole repair apparatus in accordance with the present invention allows for the repair of a damaged target screw hole, namely a screw hole in which a desired screw can no long securely be held in, so that the desired screw can once again be secured therein, thereby allowing the desired screw that has fallen out or is otherwise unable to be secured in the target screw hole to be reinserted securely back in that hole in the same alignment as intended for the target screw hole. To repair a damaged target screw hole, the fastener sleeve that defines the screw hole repair apparatus is screwed or otherwise inserted into the target screw hole until it fills the target screw hole or is otherwise disposed in the target screw hole a desired amount. Then, any remaining fastener sleeve that did not fit or is otherwise not inside the target screw hole is snapped off of the fastener sleeve at a circumferential score closest to the rim of the screw hole, enabling the fastener sleeve to be fully inside the target screw hole. The desired screw is then inserted into the remaining portion of the fastener sleeve in the target screw hole, causing the fastener sleeve to expanding outwardly into the target screw hole. This allows the desired screw to work again in the target screw hole in precisely the original alignment originally contemplated by the target screw hole.

It is contemplated that that the screw hole repair apparatus enables the repair of a target screw hole with only a screwdriver; without the need for wood putty, glue, special tools (such as a drill). In addition, the conical shape of the interior and exterior of the screw hole repair apparatus provides different diameters on the same device, thereby making it a one-size-fits-all solution. Furthermore, because the screw hole repair apparatus enables screw holes to be restored with the screw being held in the exact alignment originally contemplated for the repair hole, the screw hole repair apparatus is especially useful in circumstances where proper alignment is vital (such as hinges for cabinets and doors).

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An apparatus for repairing stripped fastener holes in a medium, comprising:
   a fastener sleeve having an exterior surface, a substantially hollow interior, a distal end, and a proximal end, wherein the fastener sleeve is configured to be selectively shortened to fully fit inside a target fastener hole;
   wherein the exterior surface and the substantially hollow interior each decrease in width from the proximal end to the distal end;
   wherein the fastener sleeve includes a proximal end section disposed on its proximal end and a plurality of sleeve sections extending sequentially to its distal end;
   wherein each of the proximal end section and sleeve sections each are separated by a circumferential score configured to enable sections of the fastener sleeve to be snapped off; and
   wherein the exterior surface of the fastener sleeve includes a plurality of discrete ridges of raised external screw threads.

2. The apparatus for repairing stripped fastener holes in a medium of claim 1, wherein each sleeve section includes at least one discrete ridge.

3. The apparatus for repairing stripped fastener holes in a medium of claim 2, wherein each sleeve section includes a pair of discrete ridges disposed on either side thereof.

4. The apparatus for repairing stripped fastener holes in a medium of claim 3, wherein the pair of discrete ridges on each sleeve section is aligned relative to each other the pair of discrete ridges on the other sleeve sections.

5. A stripped hole repair apparatus for inserting into a stripped fastener hole in a medium, comprising:
   an elongated fastener sleeve having an exterior surface and a substantially hollow interior and a distal end and a proximal end, wherein the exterior surface is conical shaped from the proximal end to the distal end, the substantially hollow interior is defined by a conical interior the proximal end to the distal end, and the fastener sleeve is configured to be selectively shortened to fully fit inside a target fastener hole;
   wherein the elongated fastener is made up of a proximal end section disposed on its proximal end and a plurality of sleeve sections extending to its distal end;
   wherein each of the sleeve sections are separated by a circumferential score configured to enable sections of the fastener sleeve to be snapped off;
   wherein the exterior surface of the fastener sleeve includes a plurality of discrete ridges of raised external screw threads; and
   wherein each sleeve section includes a pair of discrete ridges disposed on either side thereof.

6. The stripped hole repair apparatus for inserting into a stripped fastener hole in a medium of claim 5, wherein the pair of discrete ridges on each sleeve section is aligned relative to each other the pair of discrete ridges on the other sleeve sections.

7. The stripped hole repair apparatus for inserting into a stripped fastener hole in a medium of claim 5, wherein the substantially hollow interior is defined by a conical interior having ridged surface.

8. The stripped hole repair apparatus for inserting into a stripped fastener hole in a medium of claim 7, wherein the conical interior includes at least one elongated flap which runs in a narrowing manner along the wall of the conical interior in the fastener sleeve.

9. The stripped hole repair apparatus for inserting into a stripped fastener hole in a medium of claim 8, wherein the conical interior includes four elongated flaps.

* * * * *